United States Patent Office 2,858,215
Patented Oct. 28, 1958

2,858,215

PROCESS OF PREPARING VITAMIN OILS IN PARTICLE FORM

Henry M. Espoy, Long Beach, Calif., assignor to Barnett Laboratories, Inc., Long Beach, Calif., a corporation of California No Drawing. Application July 2, 1956
Serial No. 595,057

14 Claims. (Cl. 99—2)

This invention relates to a process for making oil soluble vitamin products in particulate form and to the products of said process.

The vitamin A content of fish liver oils and the advantages of their inclusion in animal and poultry feeds is well recognized. Also the value of carotene and the non-crystallizable carotenoid content of carrot oil as a low cost vitamin ingredient in feeds is well known. However, the use of these liquid ingredients in dry animal and poultry feeds, especially for those which are marketed in packaged form, has been limited because of the oily nature of these sources of vitamin A, and the difficulty in mixing them uniformly with the other feed ingredients. In addition, the potencies of the carotene, carotenoids and vitamin A oils which are dispersed in liquid form in dry feed materials, such as for example soya meal, decrease rapidly because of oxidation, even in the presence of permissible anti-oxidants.

I have discovered that fish liver oils, carrot oils, carotene dissolved in oil, including any suspended carotene, vitamin A oils, and the like may be processed with dry powdered synthetic calcium silicate gels to produce stable oxidation-resisting powdery or particulate products, by mixing the ingredients together in the proper proportions, using suitable mixing procedures which involve no mulling, rubbing or attrition of the particles.

It is therefore the principal object of this invention to provide a method for producing oil-soluble vitamins in powdery or particulate form. Another object is to provide vitamin A, carotene, dissolved or suspended in oil, fish liver oils, carrot oil, carrot wax, and the like, in the form of a free flowing particulate or powdery form. A still further object is to provide particulate or powdery forms of oil-soluble vitamin liquids which are resistant to deterioration by oxidation.

As an example of my invention, 3 parts by weight of crude carrot oil (containing carotene, carrot wax and other carotenoid materials) was mixed with 1 part by weight of dry finely powdered synthetic calcium silicate gel, to yield an apparently dry, free flowing powdery product. The manner of mixing the ingredients has an important bearing on the nature of the final product, and upon the proportions of oil which will be absorbed by the powdered gel to yield a dry powdery product. Any mulling or rubbing of the material in the process of mixing causes the otherwise powdery material to become wet and mushy and destroys its value as a dry powdery oil-carrying product. I prefer to use a hammer mill type of mixer, or blender, in the use of which there is little or no mulling or rubbing action, so that the particles of powdery product will have substantially the same sizes as the original powdered calcium silicate gel.

Well known methods of distribution of the oily product in the powdered calcium silicate may be used; for example, the oily ingredient may be sprayed on the dry material moving along on a conveyor, following which passage through a hammer mill, in suspension in air, will yield a uniformly mixed powdery product.

In another example, fish liver oil containing 129,000 U. S. P. units of vitamin A per gram was reduced to a powdery product by mixing 25 parts by weight of the oil with 10 parts by weight of the calcium silicate gel product known in the trade as "Micro-Cel" E. [This material is described by the manufacturer as a synthetic calcium silicate substantially all particles being less than 325 mesh, with 5 to 8 percent free moisture, and a bulk density of 6 pounds per cubic foot.]

The mixing was simply a stirring operation, without rubbing, and the resulting material was a seemingly dry powder. A sample of this powdery material, having 92,100 U. S. P. units per gram, was exposed in an open container for thirty days. Upon testing, it was found that the potency was reduced to 82,400 U. S. P. units, or a loss of vitamin A content of about 10.5 percent. For comparison, if this fish liver oil was exposed as a liquid in an open container for a similar length of time, most of its vitamin content was lost. When the same oil was absorbed on 9 parts by weight of expeller process soya meal and stored under similar conditions, it retained less than 70 percent of its vitamin content.

If desired, the fish liver's themselves can be used without effecting a preliminary separation of the oil. In one experiment, a lot of shark livers were ground to a paste in a hammer mill. Then 50 parts of these ground shark livers were mixed with 20 parts of synthetic calcium silicate gel powder. The resultant product was a dry, grayish powder which was suitable for use directly in animal feeds. If desired, however, all of the moisture could readily be removed by drying in a current of warm air. Through the use of this process, it is possible to retain all of the valuable proteinaceous and water-soluble constituents of fish livers which are normally lost when separating the fish liver oil.

The stability of the powdery products made by absorbing liquid vitamin materials on synthetic calcium silicate gel powders is high. For example, a mixture of 20 parts by weight of carrot oil and 12 parts by weight of the gel powder, after exposure for one month, had lost only about 1.3 percent potency and about 6.3 percent in two months. The same mixture with an added 1 percent of a commercial anti-oxidant showed approximately the same loss in potency.

Carrot wax (an impurity of crude carrot oil, and a low cost source of carotene) was mixed with synthetic calcium silicate gel in the proportions of 20 parts by weight of wax to 15 parts by weight of silicate gel powder. After standing three months, the loss in potency was only about 2 percent.

In another example, 20 parts by weight of carrot oil containing 0.627% total carotene were mixed, as described above, with 12 grams of synthetic calcium silicate gel powder. After standing in open containers, test lots showed 1.2 percent loss in 28 days and 6.2 percent in 57 days.

In other examples, carrot oil mixed in calcium silicate gel, in powdery form, and then mixed into commercial poultry feeds containing dry barley, fish solubles, etc. after one month showed only one percent loss of carotene. By comparison, carrot oil mixed into soyal meal (one of the best carriers used prior to my invention) in the proportions of 7.6 parts of oil by weight and 42.4 parts by weight of soya meal showed losses of 52 percent in 25 days, 85 percent in 55 days, and all of the carotene had been destroyed by oxidation after 88 days. This rapid deterioration of carotene mixed into feeds can be retarded by the use of certain anti-oxidants, although these have not all been approved for animal feeds.

High potency carotene or vitamin A solutions in oily mediums may also be absorbed on powdered calcium silicate gel to give apparently dry powdery products which may be marketed in such powdered form. In this form the materials are much easier to dispense, to mix with other ingredients, both powders and liquids, and are well preserved against deterioration by oxidation without the use of extraneous anti-oxidants.

I have prepared mixtures of these high potency oil soluble vitamins with powdered calcium silicate gels in proportions by weight as high as 3 parts of oil to one of gel powder, and when mixed without rubbing or mulling, as discussed above, result in free flowing powdery products.

The calcium silicate gel may be prepared by methods which are well known in the industry. One procedure is to heat a mixture of powdered lime and some form of reactive powdered silica, such as for example powdered diatomaceous earth, with water, in a steam autoclave until the lime and silica have reacted chemically to form calcium silicate gel. By regulating the amount of water in the gel, the physical properties of the dried gel made therefrom may be varied to give more or less absorptive power for oils. In at least one known process the moisture contained in the calcium silicate gel is substantially all removed by releasing the pressure on the autoclave, the residual heat driving off the moisture and leaving the calcium silicate gel structure intact even in the smallest particles. This material from the autoclave is then pulverized, preferably in a closed air conveyor system, including fans, air filters and hammer mill. I have found that the product known in the trade as "Micro-Cel" is a satisfactory material for use in my invention, although other brands of dried calcium silicate gel may also be used.

As used herein, the term vitamin A and oil soluble vitamins, or similar terms, is meant to include the carotenes as well as vitamin A, the carotenes being recognized as equivalent potential sources of vitamin A in animal metabolism.

The advantages of my invention will be understood from the above description. The low vitamin oils are made available for dry mixing in dry feed materials, optionally without the use of anti-oxidants, and are stabilized against rapid oxidation by being absorbed on the calcium silicate gel powders.

I claim:

1. The process of changing oily vitamin-containing liquids to apparently dry non-oily particulate form comprising mixing said oily liquid in a dry powdered synthetic calcium silicate gel in proportion to give an apparently dry powder, said mixing being carried out without mulling or attrition of said calcium silicate gel and said gel powder particles being finer than 325 mesh.

2. The process of changing oily vitamin-containing liquids to apparently dry non-oily particulate form comprising mixing said oily liquid in a dry powdered synthetic calcium silicate gel in proportions of not more than four parts by weight of oil to one part by weight of said gel whereby to give an apparently dry powder mix, said mixing being carried out without mulling or attrition of said calcium silicate gel and said gel powder particles being finer than 325 mesh.

3. A composition of matter containing essentially an oil soluble vitamin material, an edible oil, and powdered calcium silicate gel all particles of which are finer than 325 mesh, the proportions of said oil to said gel being selected to give a non-cohering free-flowing powdery product.

4. A composition of matter containing essentially an oil soluble vitamin material, an edible oil, and powdered calcium silicate gel, all particles of which are finer than 325 mesh, the weight proportions of said oil to said gel being not greater than about four.

5. A composition of matter containing essentially vitamin A material, an edible oil, and powdered calcium silicate gel, all particles of which are finer than 325 mesh, the weight proportions of said oil to said gel being not greater than about four.

6. A composition of matter containing essentially carotene, an edible oil, and powdered calcium silicate gel, all particles of which are finer than 325 mesh, the weight proportions of said oil to said gel being not greater than about four.

7. A composition of matter containing essentially carotene, carrot oil, and powdered calcium silicate gel, all particles of which are finer than 325 mesh, the proportions of said oil to said gel being not greater than about four.

8. A composition of matter containing essentially carotene, carrot oil, carrot wax and powdered calcium silicate gel, all particles of which are finer than 325 mesh, the proportions of said oil to said gel being not greater than about four.

9. A dry feed composition comprising an oil-soluble vitamin material dissolved in an edible oil, and a powdered calcium silicate gel, all particles of which are finer than 325 mesh, the proportions of said oil to said gel being selected to give a non-cohering powdery product, said oil and gel being premixed prior to mixing with the remainder of said dry feed materials.

10. A composition of matter containing essentially pulverized fish livers and powdered calcium silicate gel, all particles of which are finer than 325 mesh, the proportions of said oil to said gel being selected to give a non-cohering free-flowing powdery product without removal of the contained water.

11. In a process for mixing a feed composition including disintegrated dry feed materials and a vitamin-containing oil in a dry materials mixer, wherein the vitamin-containing oil is introduced into said mixer as a premix containing a mineral absorbent powder holding said oil as an apparently dry powder to render it easily mixable with the said dry feed materials, the method of forming said apparently dry premix to eliminate the oiliness, to reduce oxidation of vitamins, and to reduce the ratio of the weight of said absorbent powder to the weight of said oil, which comprises admixing without mulling or attrition, said liquid vitamin-containing oil with a powdered synthetic calcium silicate gel, all particles of which are finer than 325 mesh, in an amount sufficient to absorb all of said liquid and produce an apparently dry powder but insufficient to produce objectionable dustiness, and then dispersing said premix in said disintegrated dry feed materials by mixing in said dry materials mixer.

12. In a process for mixing a feed composition including disintegrated dry feed materials and a vitamin-containing oil in a dry materials mixer, wherein the vitamin-containing oil is introduced into said mixer as a premix containing a mineral absorbent powder holding said oil as an apparently dry powder to render it easily mixable with the said dry feed materials, the method of forming said apparently dry premix to eliminate the oiliness, to reduce oxidation of vitamins, and to reduce the ratio of the weight of said absorbent powder to the weight of said oil, which comprises admixing without mulling or attrition, said liquid vitamin-containing oil with a powdered synthetic calcium silicate gel, all particles of which are finer than 325 mesh, in the proportion of not more than four parts by weight of oil to one part by weight of said gel, and then dispersing said premix in said disintegrated dry feed materials by mixing in said dry materials mixer.

13. In a process for mixing a feed composition including disintegrated dry feed materials and fish liver oil in a dry materials mixer, wherein the fish liver oil is introduced into said mixer as a premix containing a mineral absorbent powder holding said oil as an apparently dry powder to render it easily mixable with the said dry feed materials, the method of forming said apparently dry premix to eliminate the oiliness, to reduce oxidation of vitamins, and to reduce the ratio of the weight of said absorbent powder to the weight of said oil, which comprises admixing without mulling or attrition, said liquid fish liver oil with a powdered synthetic calcium silicate gel, all particles of which are finer than 325 mesh, in the proportion of not more than four parts by weight of oil to one part by weight of said gel, and then dispersing said premix in said disintegrated dry feed materials by mixing in said dry materials mixer.

14. In a process for mixing a feed composition including disintegrated dry feed materials and a carotene-containing oil in a dry materials mixer, wherein the carotene-containing oil is introduced into said mixer as a premix containing a mineral absorbent powder holding said oil as an apparently dry powder to render it easily mixable with the said dry feed materials, the method of forming said apparently dry premix to eliminate the oiliness, to reduce oxidation of vitamins, and to reduce the ratio of the weight of said absorbent powder to the weight of said oil, which comprises admixing without mulling or attrition, said liquid carotene-containing oil with a powdered synthetic calcium silicate gel, all particles of which are finer than 325 mesh, in the proportion of not more than four parts by weight of oil to one part by weight of said gel, and then dispersing said premix in said disintegrated dry feed materials by mixing in said dry materials mixer.

References Cited in the file of this patent

UNITED STATES PATENTS

| | | |
|---|---|---|
| 1,638,700 | Molofsky | Aug. 9, 1927 |
| 2,257,545 | Curtis | Sept. 30, 1941 |
| 2,385,075 | Gunther | Sept. 18, 1945 |
| 2,427,520 | Briod | Sept. 16, 1947 |
| 2,650,202 | Hawes et al. | Aug. 25, 1953 |
| 2,708,163 | St. John | May 10, 1955 |